United States Patent
Onoda et al.

(10) Patent No.: US 8,010,688 B2
(45) Date of Patent: Aug. 30, 2011

(54) CONTENT USE MANAGEMENT SYSTEM, CONTENT USE MANAGEMENT METHOD, AND CLIENT DEVICE

(75) Inventors: Sen'ichi Onoda, Toyonaka (JP); Kouji Miura, Matsubara (JP); Katsumi Tokuda, Ikeda (JP); Motoji Ohmori, Hirakata (JP); Hiroki Murakami, Suita (JP)

(73) Assignee: Panasonic Corporation, Osaka (JP)

( * ) Notice: Subject to any disclaimer, the term of this patent is extended or adjusted under 35 U.S.C. 154(b) by 1862 days.

(21) Appl. No.: 10/754,497

(22) Filed: Jan. 12, 2004

(65) Prior Publication Data

US 2004/0260839 A1    Dec. 23, 2004

(30) Foreign Application Priority Data

Jan. 15, 2003   (JP) .................................. 2003-006603

(51) Int. Cl.
  *G06F 15/16*    (2006.01)
  *G06F 15/173*   (2006.01)
  *G06F 7/04*     (2006.01)
  *H04L 29/06*    (2006.01)
  *H04L 9/32*     (2006.01)

(52) U.S. Cl. .......... 709/230; 709/231; 709/244; 726/31; 726/32; 713/171; 713/156

(58) Field of Classification Search .......... 709/230–244; 713/153, 163, 156, 171; 726/618, 29, 31, 726/32; 705/51, 54, 57
See application file for complete search history.

(56) References Cited

U.S. PATENT DOCUMENTS

| | | | |
|---|---|---|---|
| 6,795,863 B1 * | 9/2004 | Doty, Jr. ................. | 709/231 |
| 6,961,858 B2 * | 11/2005 | Fransdonk .............. | 726/29 |
| 6,965,883 B2 * | 11/2005 | Xu et al. ................. | 705/418 |
| 6,973,499 B1 * | 12/2005 | Peden et al. ............ | 709/229 |
| 7,055,030 B2 * | 5/2006 | Negawa ................... | 713/163 |
| 7,058,809 B2 * | 6/2006 | White et al. ............ | 713/176 |
| 7,188,193 B1 * | 3/2007 | Getsin et al. ............ | 709/248 |
| 7,222,185 B1 * | 5/2007 | Day ......................... | 709/232 |
| 7,290,057 B2 * | 10/2007 | Saunders et al. ....... | 709/231 |
| 7,643,478 B2 * | 1/2010 | Lecomte et al. ........ | 370/389 |
| 2001/0037256 A1 | 11/2001 | Yazawa | |
| 2002/0095683 A1 | 7/2002 | Watanabe | |
| 2002/0172368 A1 * | 11/2002 | Peterka ................... | 380/278 |
| 2002/0184223 A1 * | 12/2002 | Miura ..................... | 707/10 |
| 2007/0067812 A1 | 3/2007 | Watanabe | |

FOREIGN PATENT DOCUMENTS

| | | |
|---|---|---|
| JP | 10-164553 | 6/1998 |
| JP | 11-312175 | 11/1999 |
| JP | 2001-051960 | 2/2001 |
| JP | 2001-283015 | 10/2001 |
| JP | 2002-094560 | 3/2002 |
| JP | 2002-300560 | 10/2002 |

* cited by examiner

*Primary Examiner* — Gregory G Todd
(74) *Attorney, Agent, or Firm* — Wenderoth, Lind & Ponack, L.L.P.

(57) ABSTRACT

A content distribution system distributes a content key and content use conditions for controlling a content use in a client apparatus to the client apparatus, via a communication channel, from either a multicast distribution server or a unicast distribution server. A content distribution management server determines by which distribution method to send the content key and content use conditions of each content according to an attribute of the content (a compression format, a compression ratio, a content holder, and the like). An encrypted content distribution server distributes only encrypted content whose content key and content use conditions are to be distributed by the unicast, and the multicast distribution server distributes encrypted content whose content key and content use conditions are superimposed by the multicast.

17 Claims, 16 Drawing Sheets

| Content Use Conditions | Distribution Method |
|---|---|
| Reproduction Times Unlimited | Multicast Distribution |
| Reproduction Times 3 | Unicast Distribution |
| Reproduction Period 2003/01/01~2003/01/31 | Unicast Distribution |
| Reproduction Period 2003/02/01~2003/02/28 | Multicast Distribution |

FIG. 2

| User ID | User Name | Password | Client ID |
|---|---|---|---|
| User_1111 | User1 | aaabbbccc | 123_abc |
| User_2222 | User2 | dddeeefff | 456_def |
| User_3333 | User3 | ggghhhiii | 789_ghi |

FIG. 3

| Content Holder ID | Content Holder Name | Password |
|---|---|---|
| Holder_1111 | C_HOLDER_1 | abcrst |
| Holder_2222 | C_HOLDER_2 | defuvw |
| Holder_3333 | C_HOLDER_3 | ghixyz |

FIG. 4

| Content ID | Content Name | Content Holder ID | Compression Format | Distribution Method | Reproduction Time (min.) | Encrypted Content Data Size (MB) |
|---|---|---|---|---|---|---|
| CONT_0001 | Mountains of the World | Holder_1111 | MPEG-2 | Unicast Distribution | 60 | 1,500 |
| CONT_0002 | Rivers of the World | Holder_2222 | MPEG-4 | Multicast Distribution | 15 | 3 |
| CONT_0003 | Forests of the World | Holder_3333 | AVI | Unicast Distribution | 10 | 180 |

FIG. 5A

| Multicast Distribution Time | Content ID | Content Key (128bit) | Content Use Conditions |
|---|---|---|---|
| 12:00 | CONT_0001 | 0xaaaa...aaaa | Reproduction Times 3 |
| 13:00 | — | — | — |
| 14:00 | CONT_0003 | 0xcccc...cccc | Reproduction Period 2003/01/01~2003/01/31 |

Additional Distribution Contents

FIG. 5B

| Multicast Distribution Time | Content ID | Content Key (128bit) | Content Use Conditions |
|---|---|---|---|
| 12:00 | CONT_0001 | 0xaaaa...aaaa | Reproduction Times 3 |
| 13:00 | CONT_0002 | 0xbbbb...bbbb | Reproduction Times 1 |
| 14:00 | CONT_0003 | 0xcccc...cccc | Reproduction Period 2003/01/01~2003/01/31 |

FIG. 6

| Content ID | Content Key (128 bit) | Content Use Conditions |
|---|---|---|
| CONT_0001 | 0x1111...1111 | Reproduction Times 3 |
| CONT_0002 | 0x2222...2222 | Reproduction Period 2003/01/01~2003/01/31 |
| CONT_0003 | 0x3333...3333 | Reproduction Times 10 |

FIG. 7

| Content ID | Encrypted Content Data Size (MB) | Distribution Method | Storage Place for Encrypted Content Data |
|---|---|---|---|
| CONT_0001 | 1,500 | Unicast Distribution | C:¥content¥cont_0001.enc |
| CONT_0002 | 3 | Multicast Distribution | C:¥content¥cont_0002.enc |
| CONT_0003 | 180 | Unicast Distribution | C:¥content¥cont_0003.enc |

FIG. 10

| Content ID | Content Name | Content Holder Name | Compression Format | Reproduction Time (Min.) | Encrypted Content Data Size (MB) |
|---|---|---|---|---|---|
| CONT_0001 | Mountains of the World | CONTENTHOLDER_ABC | MPEG-2 | 60 | 1,500 |
| CONT_0002 | Rivers of the World | CONTENTHOLDER_DEF | MPEG-4 | 15 | 3 |
| CONT_0003 | Forests of the World | CONTENTHOLDER_GHI | AVI | 10 | 180 |

FIG. 12A

| Content Compression Format | Distribution Method |
|---|---|
| MPEG-2 | Unicast Distribution |
| MPEG-4 | Multicast Distribution |
| AVI | Unicast Distribution |

FIG. 12B

| Content Holder ID | Distribution Method |
|---|---|
| Holder_1111 | Unicast Distribution |
| Holder_2222 | Multicast Distribution |
| Holder_3333 | Unicast Distribution |

FIG. 12C

| Average Rate of CBR and VBR | Distribution Method |
|---|---|
| ~500kbps | Multicast Distribution |
| 500kbps~15Mbps | Unicast Distribution |
| 15Mbps~ | Unicast Distribution |

FIG. 12D

| Content Use Conditions | Distribution Method |
|---|---|
| Reproduction Times Unlimited | Multicast Distribution |
| Reproduction Times 3 | Unicast Distribution |
| Reproduction Period 2003/01/01~2003/01/31 | Unicast Distribution |
| Reproduction Period 2003/02/01~2003/02/28 | Multicast Distribution |

CONTENT USE MANAGEMENT SYSTEM, CONTENT USE MANAGEMENT METHOD, AND CLIENT DEVICE

BACKGROUND OF THE INVENTION (1) Field of the Invention

The present invention relates to a content usage management system which comprises a server for distributing a digital content such as video and music data and a client apparatus, a content usage management method and a client apparatus.

(2) Description of the Prior Art

In a content distribution system via a network, a content to be distributed is encrypted and the encrypted content and a decryption key for the encrypted content (hereafter referred to as content key) is distributed to a user terminal.

As for a distribution method of a content key, two types of distribution methods exist: a unicast distribution which distributes a content key one on one to only a client apparatus that requests the content use; and a multicast distribution which distributes a content key to all client apparatuses at once even when they do not request the content use. In a conventional content distribution system, a content key is distributed by the same distribution method regardless of the types of contents.

The above description is disclosed in a patent literature, Japanese Laid-Open application No. 11-312175.

However, the number of clients to which a content key is distributed differs depending on contents. If the number of client apparatuses which use the content is large, the multicast distribution reduces processing loads on a server than the unicast distribution since the unicast distribution distributes a content key after communicating with each client apparatus. On the other hand, the unicast distribution can ensure higher security than the multicast distribution to protect copyrights since the unicast distribution can keep in a log information about which content keys were sent to which client apparatuses. In the conventional technologies, even if sending a content key by using the multicast distribution can reduce the processing load on a server depending on contents, the method which puts more processing loads on a server is actually used to distribute a content key because a content key is distributed by either one of the distribution methods regardless of content types. It is also distributed by the method which provides lower security even if higher security is desired depending on contents.

SUMMARY OF THE INVENTION

Examining the above mentioned problems, the present invention aims to provide a content usage management system capable of distributing a content decryption key, the system selectively reducing processing loads in the system or securing security.

The content usage management system according to the present invention is a content usage management system for distributing, via a network, usage control data for controlling a content use in a client apparatus, comprising: one or more distribution servers for distributing the usage control data to the client apparatus by a plurality of different distribution methods; and a distribution management server for determining a distribution method out of the plurality of distribution methods for distributing usage control data of each content according to attributes of said each content, wherein one of the distribution servers distributes the usage control data by the determined distribution method.

As above described, according to the present invention, the content usage management system comprises a distribution server for distributing the usage control data by the plurality of different distribution methods, and is allowed to distribute the usage control data by the most appropriate distribution method from the standpoint of concerning processing loads on the distribution server and ensuring security by switching a distribution method for the usage control data depending on content.

The attributes of each content include a compression format of each content, and the distribution management server may determine the distribution method for the usage control data according to the compression format of each content.

The attributes of each content include information to identify a content provider that provides each content, and the distribution management server may determine the distribution method for the usage control data according to the content provider of each content.

The attributes of each content include a compression ratio of each content, and the distribution management server may determine the distribution method for the usage control data according to the compression ratio of each content.

The attributes of each content include a use condition of each content, and the distribution management server may determine the distribution method for the usage control data according to the use condition of each content.

Each of one or more distribution servers may include at least one of the following units: a unicast distribution unit operable to distribute the usage control data by a unicast distribution method for distributing data in response to a request from the client apparatus; and a multicast distribution unit operable to distribute the usage control data by a multicast distribution method for distributing data all at once to a plurality of client apparatuses at a predetermined distribution time.

The distribution management server may include: a distribution method determination rule holding unit operable to hold a distribution method determination rule indicating a rule to determine the distribution method; and a distribution method determination unit operable to determine the distribution method according to the distribution method determination rule, with reference to the distribution method determination rule corresponding to the attributes of each content.

Each of the distribution servers including the unicast distribution unit may further include an authentication unit to authenticate the client apparatus as an authorized user when the client apparatus is recognized as a previously registered client apparatus through communication with each client apparatus, wherein the unicast distribution unit may distribute the usage control data only to the client apparatus recognized as an authorized user.

The usage control data include a decryption key to decrypt an encrypted content, and the client apparatus may include: a usage control data obtainment unit operable to obtain the usage control data corresponding to said each content from any one of the distribution servers; a decryption unit operable to extract the decryption key from the obtained usage control data and decrypt the content corresponding to the usage control data using the extracted decryption key; and a reproduction unit operable to reproduce the decrypted content.

The usage control data further include a use condition for using content, and the client apparatus may further include a reproduction control unit operable to extract the use condition from the obtained usage control data and control the reproduction unit to perform the reproduction within an extent to which the extracted use condition is satisfied.

Further, the content usage management method according to the present invention is a content usage management method for a server to distribute, via a network, usage control data for controlling a content use in a client apparatus, comprising: a distribution method determination step of determining a distribution method for distributing the usage control data of each content according to attributes of said each content; and a distribution step of distributing the usage control data by the determined distribution method out of the plurality of different distribution methods.

In the content usage management method, a distribution method determination rule indicating a rule of determining the distribution method is previously held, and in the distribution method determination step, the distribution method may be determined according to the distribution method determination rule, with reference to the distribution method determination rule corresponding to the attributes of each content.

A client apparatus according to the present invention is a client apparatus in a content usage management system for distributing, via a network, usage control data for controlling a content use in the client apparatus by one of a plurality of different distribution methods, comprising: a content request unit operable to request a content server which distributes content to distribute the content and obtain the content; a distribution method judgement unit operable to judge a distribution method for the usage control data corresponding to the requested content, according to success or failure of the obtainment of the content distributed from the content server; and a usage control data obtainment unit operable to obtain the usage control data from a distribution server that distributes the usage control data by the judged distribution method.

As above described, according to the present invention, the client apparatus is allowed to judge a distribution method for the usage control data even when the usage control data to be distributed by a multicast is distributed being superimposed on the content. Therefore, the client apparatus can obtain the usage control data without any problems and use the content even when a distribution method for the usage control data differs depending on the content.

It is a client apparatus in a content usage management system for distributing, via a network, usage control data for controlling a content use in the client apparatus by one of a plurality of different distribution methods. The client apparatus may comprise a content obtainment unit operable to obtain content including information indicating a distribution method for usage control data corresponding to each content from a content server which distributes contents; a distribution method identification unit operable to extract information indicating the distribution method from the obtained content and identify the distribution method for the usage control data corresponding to said content based on the extracted information; and a usage control data obtainment unit operable to obtain the usage control data from a distribution server that distributes the usage control data by the identified distribution method. Accordingly, the client apparatus can identify a distribution method for the usage control data even when the information indicating the distribution for the usage control data is superimposed on the content. As a consequence, the client apparatus can obtain the content without any problems and use the content even when a distribution method for the usage data differs depending on the content.

Also, it is a client apparatus in a content usage management system for distributing, via a network, usage control data for controlling a use of content in the client apparatus by one of a plurality of different distribution methods, comprising: a method information obtainment unit operable to obtain information indicating a distribution method for each usage control data from a server which determines a distribution method for the usage control management data; a distribution method identification unit operable to identify the distribution method for the usage control data corresponding to the content based on the information indicating the distribution method; and a usage control data obtainment unit operable to obtain the usage control data from a distribution server that distributes the usage control data by the identified distribution method. As above described, the client apparatus can identify a distribution method for the usage control data even when the information indicating the distribution method for the usage control data is obtained from a server which determines the distribution method for the usage control data. As a consequence, the client apparatus can obtain the usage control data without any problems and use the content even when a distribution method for the usage data differs depending on the content.

Note that the present invention can be embodied not only as a content usage management system as described above, but also as a unit such as a content distribution management server which comprises the content usage system, a user management server, an encrypted content distribution server, a unicast distribution server, a multicast distribution server and a client apparatus, as well as embodied as a program that lets a computer for a regular use such as a personal computer execute the distinctive motions. And it should be note that the program can be distributed via a readable recording medium such as a CD-ROM and a transmission channel such as the Internet.

BRIEF DESCRIPTION OF THE DRAWINGS

FIG. 2 is a diagram showing an example of management data in a user management DB.

FIG. 3 is a diagram showing an example of management data in a content holder management DB.

FIG. 4 is a diagram showing an example of management data in a content distribution method management DB.

FIG. 5A is a diagram showing an example of a distribution schedule before updated held in a distribution schedule DB.

FIG. 5B is a diagram showing an example of the distribution schedule after updated held in the distribution schedule DB.

FIG. 6 is a diagram showing an example of management data in a distribution data management DB.

FIG. 7 is a diagram showing an example of management data in an encrypted content management DB.

FIG. 10 is a diagram showing an example of content metadata.

FIG. 12A is a diagram showing an example of management data of a distribution method determination rule DB in the case where a parameter is a compression format of content.

FIG. 12B is a diagram showing an example of the management data of the distribution method determination rule DB in the case where the parameter is a content holder ID.

FIG. 12C is a diagram showing an example of the management data of the distribution method determination rule DB in the case where the parameter is an average rate of CBR and VBR.

FIG. 12D is a diagram showing an example of the management data of the distribution method determination rule DB in the case where the parameter is the content use conditions.

DETAILED DESCRIPTION OF THE INVENTION

The following describes a preferred embodiment according to the present invention with reference to FIGS. 1 to 17.

Figure 1:
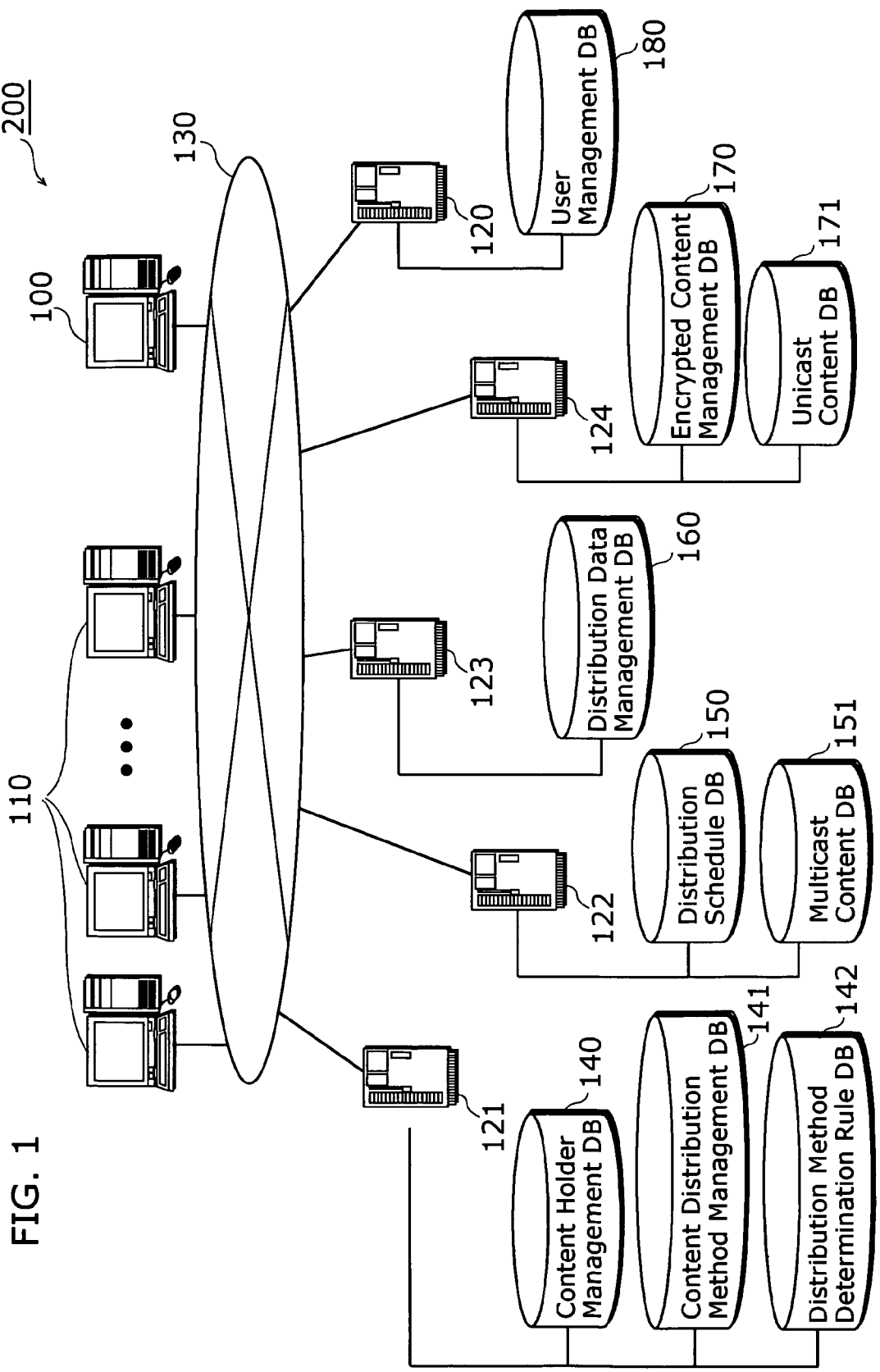
FIG. 1 is a conceptual diagram of a content distribution service system according to the present invention.

FIG. 1 is a conceptual diagram of a video content distribution service system according to the present embodiment. Each of client apparatuses 110 is connected, via a communication channel 130 such as the Internet, to a content distribution management server 121, a multicast distribution server 122, a unicast distribution server 123, an encrypted content distribution server 124, and a user management server 120. In addition, the content distribution management server 121 is connected, via the communication channel 130 such as the Internet, to the multicast distribution server 122, the unicast management server 123, the encrypted content distribution server 124, and the user management server 120. Furthermore, the multicast distribution server 122 and the unicast distribution server 123 are collectively referred to as the content key distribution server.

The video content distribution service using the present system is a service to provide an environment in which pre-registered users can reproduce a video content by using the client apparatuses 110 via the communication channel 130 such as the Internet.

Content distributed to users is encrypted by a content holder and registered, once via the content distribution management server 121, at the multicast distribution server 122 or the encrypted content distribution server 124.

Users obtain the encrypted content from the multicast distribution server 122 or the encrypted content distribution server 124. A key to decrypt the content (hereafter referred to as content key) and content use conditions is distributed by either of the content key distribution servers, the multicast distribution server 122 or the unicast distribution server 123. The content whose content key is distributed by unicast distribution is registered at the encrypted content distribution server 124, and the content whose content key is distributed by multicast distribution is registered at the multicast distribution server 122.

The content use conditions are the restrictions for users to use contents, which define the number of reproduction times available, the validity period of reproduction, and the time duration of reproduction. The client apparatus 110 decrypts the obtained encrypted content with its content key and reproduces the content according to the content use conditions. The number of reproduction times available is a limit of the number of times that a user can use the content. The number decreases each time when the content is used and the content cannot be used when the number of reproduction times available becomes zero. The validity period of reproduction is a period of time during which the content can be used. The content is available for use only when it is used during the validity period. The time duration of reproduction is a remaining time during which the content is still available. It decreases as much as the content is used and cannot be used when the time permitted becomes zero.

Here, the components of the present system are explained.

The client apparatus 110 is an apparatus for a user to reproduce content. Also, it has a client ID which is an identifier to uniquely distinguish the apparatus. The client ID is determined at the time of shipment from a factory and the determined client ID is not altered by the user after it was shipped. Furthermore, the client apparatus 110 can confirm by the client ID about the availability of the distribution service by the unicast distribution and the multicast distribution of the present system.

The user management server 120 manages users who subscribe to a content distribution service using the present system. Furthermore, it has a user management database (hereafter referred to as "DB") 180. The user management DB 180 holds user IDs for uniquely distinguishing users and user names, passwords to authenticate users, client IDs of the client apparatuses 110 of the users who use such apparatuses, and the like.

FIG. 2 shows an example of data held and managed at the user management DB 180.

FIG. 2 shows that the user ID "User_1111" and the password "aaabbbccc" are assigned for the user name "User 1" and that the user possesses a client apparatus 110 with the client ID "123_abc." The user ID is assigned by the user management server and the user him/herself sets the password.

The content distribution management server 121 has the functions of receiving a request for a content distribution from the content holder and determining a distribution method for a content key and content use conditions. Moreover, the content distribution management server 121 manages content holders and each content distribution method. The content distribution management server 121 has a content holder management DB 140, a content distribution method management DB 141, and a distribution method determination rule DB 142. The content holder management DB 140 has a content holder ID to uniquely distinguish a content holder, a content holder name, and a password for an authentication to hold and manage information relating to a content holder which receives requests for the content distribution. FIG. 3 shows an example of data held and managed at the content holder management DB 140.

FIG. 3 shows, for example, that the content holder ID "Holder_1111" and the password "abcrst" are assigned for the content holder name "C_HOLDER_1".

The content distribution method management DB 141 holds and manages a content ID to uniquely distinguish the content, a content name, a content holder ID of a content holder which supplies the content, a content compression format, a distribution method of a content key and content usage conditions, reproduction time period of the content, data size of the encrypted content, and the like. FIG. 4 shows an example of data held and managed in the content distribution method management DB 141.

FIG. 4 shows, for example, that "Mountains of the World" described as the content ID "CONT_0001" is a content owned by the content holder ID "Holder_1111" having its compression format as "MPEG-2", its distribution method as "the unicast method", its reproduction time as "60 minutes", and its data size as "1,500 MB".

The distribution method determination rule DB 142 holds and manages a rule to determine a distribution method depending on contents. The details about the data held and managed by the distribution method determination rule DB 142 are discussed later.

The multicast distribution server 122 distributes a content key and content use conditions daily at the pre-scheduled time by IP multicast to a client apparatus 110 owned by a user who is managed at the user management server 120. The multicast distribution server 122 has a distribution schedule DB 150 and a multicast content DB 151. The distribution schedule DB 150 holds and manages time when a content key is distributed by the multicast, a content ID of a content by which the distributed content key can make the content available for its reproduction, a content key to be distributed, content use conditions, and the like. The multicast content DB 151 stores encrypted content data of only a content of the content key which is distributed by the multicast distribution. FIGS. 5A and 5B are diagrams showing tables that describe an example of a distribution schedule held and managed at the distribution schedule DB 150.

As is shown in FIG. 5A, the content of the content ID "CONT_0001" is encrypted with the content key "0xaaaa . . . aaaa". The content use condition of the content ID "CONT_0001" indicates limitations of "the number of reproduction times 3" where the content key is scheduled to be distributed at "12:00". In addition to this, the distribution schedule table describes a file path and the like which indicate a storage place for each content in the multicast content DB 151.

The unicast distribution server 123 is a server which distributes a content key and content use conditions when there is a request from a user managed at the user management server 120. The unicast distribution server 123 has a distribution data management DB 160. The distribution data management DB 160 holds and manages a content ID whose content can be reproduced by the distributed content key, a content key to be distributed, and content use conditions. FIG. 6 shows an example of data managed at the distribution data management DB 160. FIG. 6 shows that the content of the content ID "CONT_0001" is encrypted by the content key "0x1111 . . . 1111." The content use condition of the content ID "CONT_0001" indicates the limit as "the number of reproduction times is three times."

The encrypted content distribution server 124 is a server for a user to download an encrypted content. The encrypted content distribution server 124 has an encrypted content management DB 170 and a unicast content DB 171. The encrypted content management DB 170 holds and manages a file path and the like where a content ID, data size of an encrypted content and encrypted content data are stored. The unicast content DB 171 stores the encrypted content data of the content whose content key is distributed by the unicast. FIG. 7 shows an example of data held and managed at the encrypted content management DB 170. FIG. 7 shows that data size of the encrypted content with the content ID "CONT_0001" is "1,500 MB", the method of content distribution is the unicast distribution, and the encrypted content data is stored in "C: ¥ content ¥ cont_0001.enc".

Figure 8A:
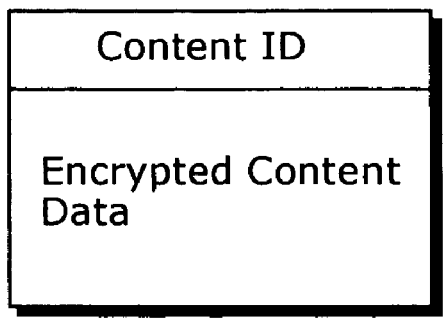
FIG. 8A is a diagram showing a data structure of an encrypted content stored in a unicast content DB shown in FIG. 1.
Figure 8B:
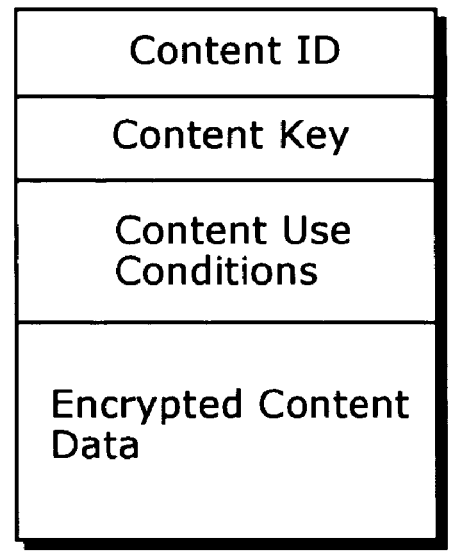
FIG. 8B is a diagram showing a data structure of the encrypted content stored in a multicast content DB shown in FIG. 1.

FIG. 8A and FIG. 8B show a difference of data structures between an encrypted content stored in the multicast content DB 151 and an encrypted content stored in the unicast content DB 171. FIG. 8A is a diagram showing a data structure of the encrypted content stored in the unicast content DB 171 shown in FIG. 1. FIG. 8B is a diagram showing a data structure of the encrypted content stored in the multicast content DB 151 shown in FIG. 1. As shown in FIG. 8A, the content whose content key is distributed by the unicast is comprised of a content ID, encrypted content data, and the like. On the other hand, the content whose content key is distributed by the multicast, as shown in FIG. 8B, is comprised of a content ID, a content key, content use conditions, an encrypted content data, and the like. That is, the content of FIG. 8B is the result of superimposing a content key and content use conditions on the content of FIG. 8A. The data of the content key and the content use conditions shall be protected to be available only for specified client apparatuses 110 by using a function of limiting client apparatuses 110 which can use received data. Specifically, the content key and the content use conditions superimposed on the content and distributed by the multicast shall be pre-encrypted. The decryption key to decrypt the encrypted content key and the content use conditions is distributed only to the pre-registered users. The distribution methods of this decryption key includes a method distributing a client apparatus 110 whose nonvolatile memory such as a ROM (Read Only Memory) stores a content key only to a pre-registered user and a method distributing a recording medium that recorded this decryption key to a pre-registered user. These methods allow a client apparatus of a pre-registered user to read out a decryption key from the ROM or a distributed recording medium and to decrypt a content key and content use conditions superimposed on a content distributed by the multicast. This client apparatus 110, by using this decrypted content key, decrypts an encrypted content and then can use the content according to the decrypted content use conditions. Note that the decryption key to decrypt an encrypted content key does not necessarily need to be distributed in a ROM and a recording medium but may be previously distributed by a secure communication to the registered users. This encryption method is further described in the following: a non-patent literature, Nakano, et al, "Digital Content Protection Key Management Method."; The 2001 Symposium on Cryptography and Information Security, 5A-5, 2001. In addition, the method of allowing the use of a content key and content use conditions distributed by the multicast only to a registered user is not limited to the digital content protection key management method but other methods may be also applied. The encrypted content having the above data structure may be generated by the content distribution management server 121 and stored in the multicast content DB 151 or may be generated by the multicast distribution server 122 and stored in the multicast content DB 151.

A content registration terminal 100 is a terminal used by the content holder for registering a content distributed to the content distribution management server 121 by the content holder. The content registration is discussed later.

The following explains a registration of a distributed content by the content holder, a determination method of a distribution method, a user registration by a user and content use of a user on each process in the service.

First, the registration of a distributed content by the content holder is explained.

Figure 9:
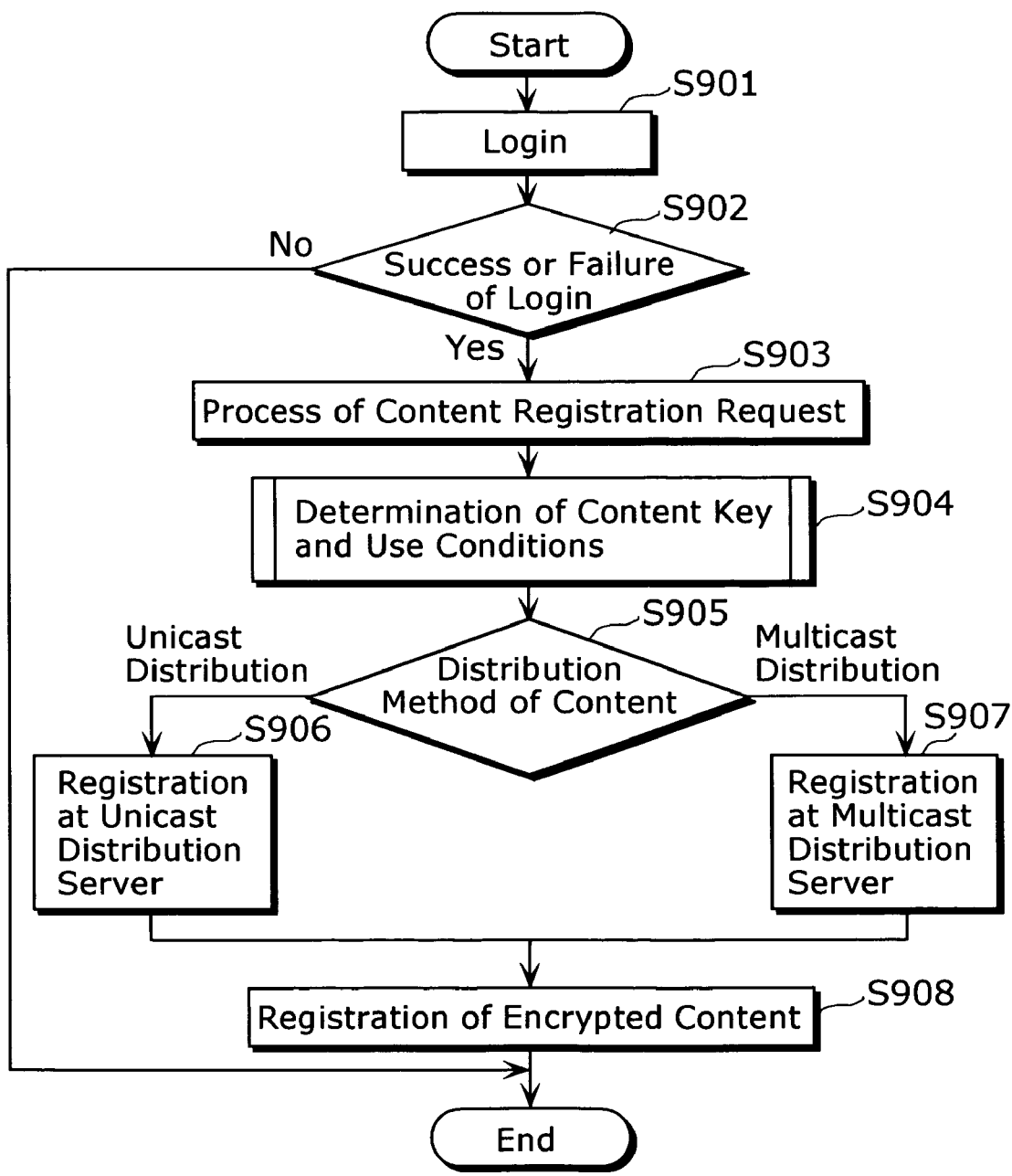
FIG. 9 is a flowchart of a content registration by a content holder.

The content holder requests a content registration to the content distribution management server 121 by using the content registration terminal 100. FIG. 9 shows a flowchart of the content registration process by the content holder.

The content distribution management server 121 authenticates the content holder before it receives a registration request of a content to be distributed from the content holder. According to the present embodiment, the content holder needs to be registered previously at the content holder management DB 140. The content holder sends a content holder ID and a password to the content distribution management server 121, via the communication channel 130, by using the content registration terminal 100 when requesting a registration of the content to be distributed. The content distribution management server 121 judges success or failure of a login by checking a pair of the received content holder ID and a password with the data registered at the content holder management DB 140 (S901).

After the login succeeded at the content distribution management server 121 (S902), the content holder sends a registration request of a content to be distributed to the content distribution management server 121 (S903). Here, the content holder sends an encrypted content, a content key, content use conditions, and content metadata. In the present embodiment, a compression format of the content is MPEG-2 and the content is encrypted using AES (Advanced Encryption Standard) with a 128-bit key. Refer to ISO/IEC 13818 for details about MPEG-2, and to FIPS-197 for details about AES.

The metadata describes "a content ID" which distinguishes a content uniquely, "a content name", "a content holder name", "a compression format" of a content, "reproduction time", and "a data size of an encrypted content". FIG. 10 shows an example of metadata. FIG. 10 describes the content name for the content of the content ID "CONT_0001" as "Mountains of the World", and the content holder that provided the content as "CONTENTHOLDER_ABC". The compression format is "MPEG-2", the reproduction time is "60 minutes", and the data size of the encrypted content is "1,500 MB". Note that metadata may also include other information such as "a production year", a compression ratio "CBR (Constant Bit Rate) and a standard rate of VBR (Variable Bit Rate)".

The content distribution management server 121 determines a distribution method of a content key to be registered according to the compression format in metadata received by the content registration request from the content holder and according to the distribution method determination rule DB 142 (S904). The determination means of a content key distribution method are discussed later.

When the distribution method is determined as the unicast distribution (S905), the content distribution management server 121 registers a content key, content use conditions, metadata, and content distribution conditions at the unicast distribution server 123 (S906). In addition, the content distribution management server 121 registers the encrypted content data at the encrypted content distribution server 124. The data shown in FIG. 6 are used as data held and managed at a distribution data management DB 160 of the unicast distribution server 123.

When the distribution method is determined as the multicast distribution (S905), the content distribution management server 121 registers a content key, content use conditions, metadata and encrypted content data at the multicast distribution server 122 (S907). The multicast distribution server 122 stores newly registered encrypted content data in the multicast content DB 151, adds a distribution schedule of a newly registered content to the available time on the schedule and updates the distribution schedule DB 150.

FIGS. 5A and 5B show how the distribution schedule DB 150 is updated. As shown in FIG. 5A, think about the case where the content distribution schedule of the content with the content ID "CONT_0002", the content key "0xbbbb . . . bbb (128-bit)", and the content use condition "reproduction times 1" is added to the distribution schedule DB 150 before updating. The distribution schedule corresponding to "13:00" is available before the update so that such available time is assigned as a distribution schedule of the content to be added and the distribution schedule DB 150 is updated, which generates an updated condition of the distribution schedule DB as shown in FIG. 5B.

The content distribution management server 121, after registering a content key and content use conditions at each distribution server following the determined distribution method, registers the encrypted content whose content key is to be distributed by the unicast method at the content distribution server 124 (S908), and terminates the process.

Figure 11:
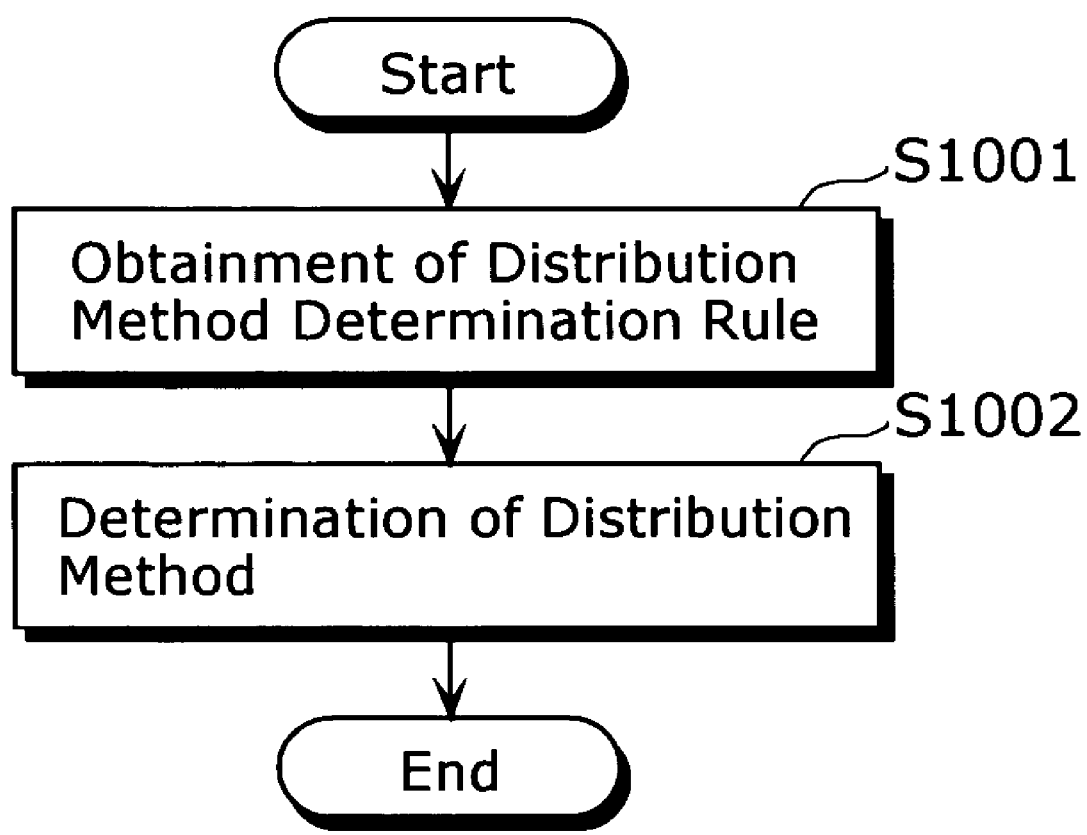
FIG. 11 is a flowchart of a determination method of a distribution method for a content key and use conditions.

Next, referring to FIG. 11, the details about the process in determination means of a distribution method of the content key shown in S904 in FIG. 9 is explained.

The content distribution management server 121, after receiving the content metadata from the content holder, determines a distribution method of a content key and content use conditions. Specifically, the content distribution management server 121 firstly obtains a content key distribution method determination rule from the distribution method determination rule DB 142 (S1001).

Assuming that the number of content users changes depending on a compression format of the content, a content compression format described in the metadata of the content serves as a parameter for a determination of a distribution method of a content key and content use conditions in the present embodiment.

FIG. 12A shows an example of data (a distribution method determination rule) held and managed at the distribution method determination rule DB 142 of the present embodiment. In this rule, a compression format in metadata of the content to be registered is considered as a parameter for determining a distribution method. By using the parameter, the distribution method is determined according to the distribution method determination rule (S1002). In this case, the rule is set to select the unicast distribution if the compression format is MPEG-2 or AVI (Audio, Video, stillImages), or the multicast distribution if the format is MPEG-4. Refer to ISO/IEC 14496 for details about MPEG-4.

The following explains other examples of data managed at the above-mentioned distribution method determination rule DB 142.

FIG. 12B, assuming that there is a request to change a distribution method depending on a content holder, shows an example of the distribution method determination rule in the case where the parameter to determine a content distribution method is a content holder ID. The rule is set to select the unicast distribution if the content holder ID is "Holder_1111" or "Holder_3333", or the multicast distribution if the content holder ID is "Holder_2222".

FIG. 12C, assuming that the number of users who use the content changes depending on picture quality of the content, shows an example of the distribution method determination rule in the case where the parameter to determine a content distribution method is set as the average rate of CBR or VBR. Here, the rule is set to select the multicast distribution if the average rate of CBR and VBR is less than 500 kbps or the unicast distribution if it is over 500 kbps and less than 15 Mbps, or 15 Mbps or more.

FIG. 12D, assuming that there is a request of changing a distribution method according to the elapsed time since the content was first distributed, shows an example of the distribution method determination rule if the parameter which determines the content distribution method is considered as the content use conditions. The rule is set to select the unicast distribution if the content use conditions are "reproduction times 3" and "reproduction period 2003/01/01~2003/01/31"

and the multicast distribution if the conditions are "reproduction times no limitations", or "reproduction period 2003/02/01~2003/02/28".

Figure 13:
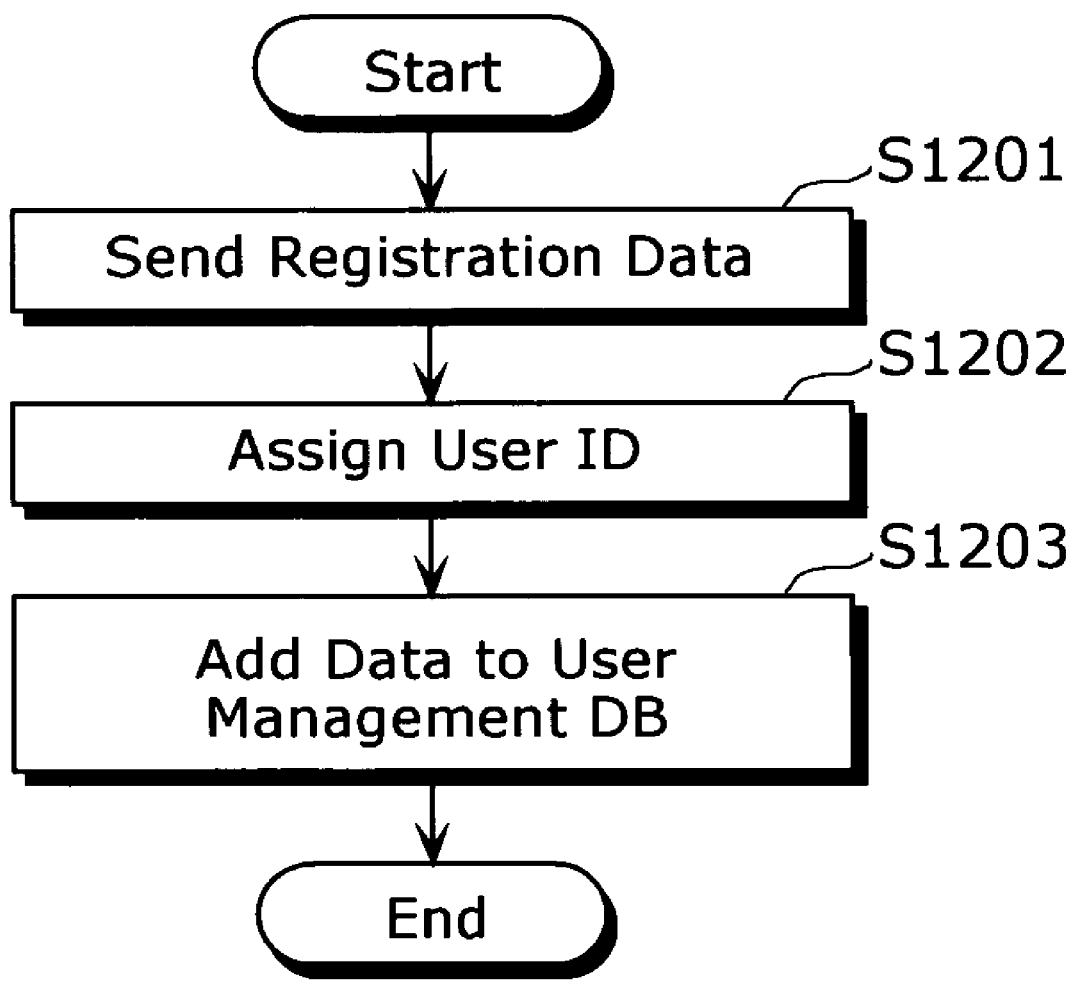
FIG. 13 is a flowchart of a user registration.

Referring next to FIG. 13, the operation of the user registration is explained.

A user previously registers at the user management server 120 before using a content. More specifically, the user first requests his/her registration to the user management server 120 by using his own client apparatus 110. Then the user sends his/her user name, a password, and a client ID of his/her client apparatus 110 to the user management server (S1201). While a client ID of a client apparatus 110 can be manually inputted by its user together with the user name and the password, it is general that the client apparatus 110 automatically attaches a client ID to the user name and the password which the user inputted and sends the resultant. The user management server 120 which has received a registration request of the user assigns a user ID (S1202), adds data to a user management DB 180 (S1203) and terminates the process after reporting the completion of the user registration to the client apparatus 110.

Figure 14:
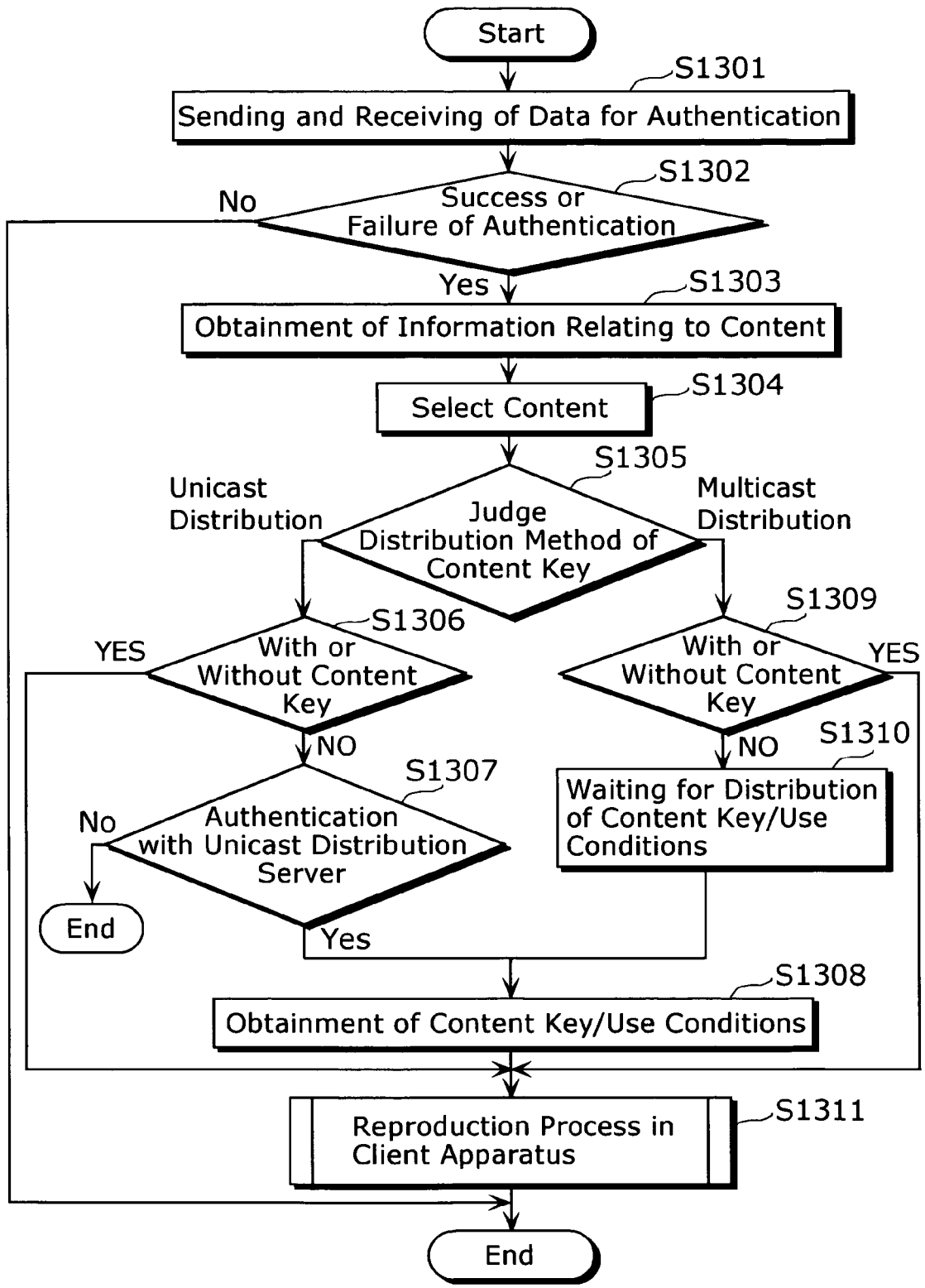
FIG. 14 is a flowchart of a content use.

Referring next to FIG. 14, the operation of a content use by a user is explained.

The service of the content use is provided only to the registered users, and users are therefore required to be authenticated once at the user management server 120. Accordingly, sending and receiving of data which is necessary for the authentication is performed between the client apparatus 110 and the user management server 120 (S1301). The client apparatus 110 decides success or failure of the authentication and the following processes are performed only if the authentication is succeeded (S1302).

A user, when they use a content, obtains information relating to the content, which are distributed now, from the content distribution management server 121 (S1303).

As shown in FIG. 4, information relating to a content includes a content ID, a content name, a content holder name which provides the content (or a content holder ID), a compression format, a distribution method of a content key, content reproduction time, and the data size of an encrypted content. The client apparatus 110 generates a content list to request a content distribution and indicates it to its user, based on the information about the content obtained from the content distribution management server 121.

The User selects a content which he/she wants to use from the content list (S1304). The client apparatus 110 sends a distribution request of the content selected from the content list to the encrypted content distribution server 124. The encrypted content distribution server 124 distributes an encrypted content only when the content key of the content requested for its distribution is distributed by the unicast. The client apparatus 110, when it could obtain an encrypted content from the encrypted content distribution server 124, judges that the distribution method of the content key is the unicast distribution (S1305). On the other hand, the client apparatus 110, if it could not obtain the encrypted content from the encrypted content distribution server 124, judges that the distribution method of the content key is the multicast distribution.

Following explains separately about the distribution methods of a content key of a selected content and content use conditions.

The case is explained where a content key of a selected content and content use conditions are distributed by multicast distribution. When the content key of the selected content is judged to be distributed by unicast distribution, the client apparatus 110 further examines whether the content key of the selected content is held inside the client apparatus 110 (S1306). When the client apparatus 110 holds the content key of the selected content already, the content is reproduced by the client apparatus 110 using the content key held by the client apparatus 110 (S1311). When the client apparatus 110 does not hold the content key of the selected content, authentication is conducted between the client apparatus 110 of a user and the unicast distribution server 124, and a communication ensuring confidentiality and anti-falsification is carried out (S1307). While the present embodiment does not particularly describe a system of such communication method, SSL (Secure Sockets Layer) and the like is used. SSL is referred to A. Frier, et al. "The SSL 3.0 Protocol", Netscape Communications Corp., 18 Nov. 1996. Note that the authentication between the client apparatus 110 and the unicast distribution server 123 may be substituted by authentication by a PKI method or by a common key method. Through the above-mentioned communication, the client apparatus 110 obtains the content key and content use conditions from the unicast distribution server 123 (S1308). At the step S1307, if the authentication with the unicast distribution server 123 is failed, the client apparatus 110 terminates the process.

The case is explained where a content key of a selected content and content use conditions are distributed by multicast distribution. When the content key of the selected content is judged to be distributed by multicast distribution, the client apparatus 110 examines whether the client apparatus 110 holds the content key of the selected content inside the client apparatus 110 (S1309). When the client apparatus holds the content key of the selected content already, the content is reproduced by the client apparatus 110 using the content key held by the client apparatus 110 (S1311). When the client apparatus 110 does not hold the content key of the selected content, the client apparatus 110 receives the content key from the multicast distribution server 122. In the multicast distribution, the multicast distribution server 122 distributes content, a content key, and content use conditions by the multicast based on a previously set distribution schedule. Since the client apparatus 110 does not hold the content key and content use conditions inside the client apparatus 110, the client apparatus 110 waits until the next multicast distribution (S1310). The client apparatus 110 can obtain a schedule of the multicast distribution from the multicast distribution server 122. The distribution method by the multicast of the present embodiment is implemented by the distribution method with a function of limiting the number of client apparatuses 110 that can use received data, because it is needed to be distributed only to the client apparatuses 110 used by users who are managed at the user management server 120. The specific implementation method is referred to Nakano, et al, "Digital Content Protection Key Management Method."; The 2001 Symposium on Cryptography and Information Security, 5A-5, 2001.

Reproduction is performed inside the client apparatus 110, after content, a content key, and content use conditions are obtained in each of the above-mentioned distribution processes (S1311).

Figure 15:
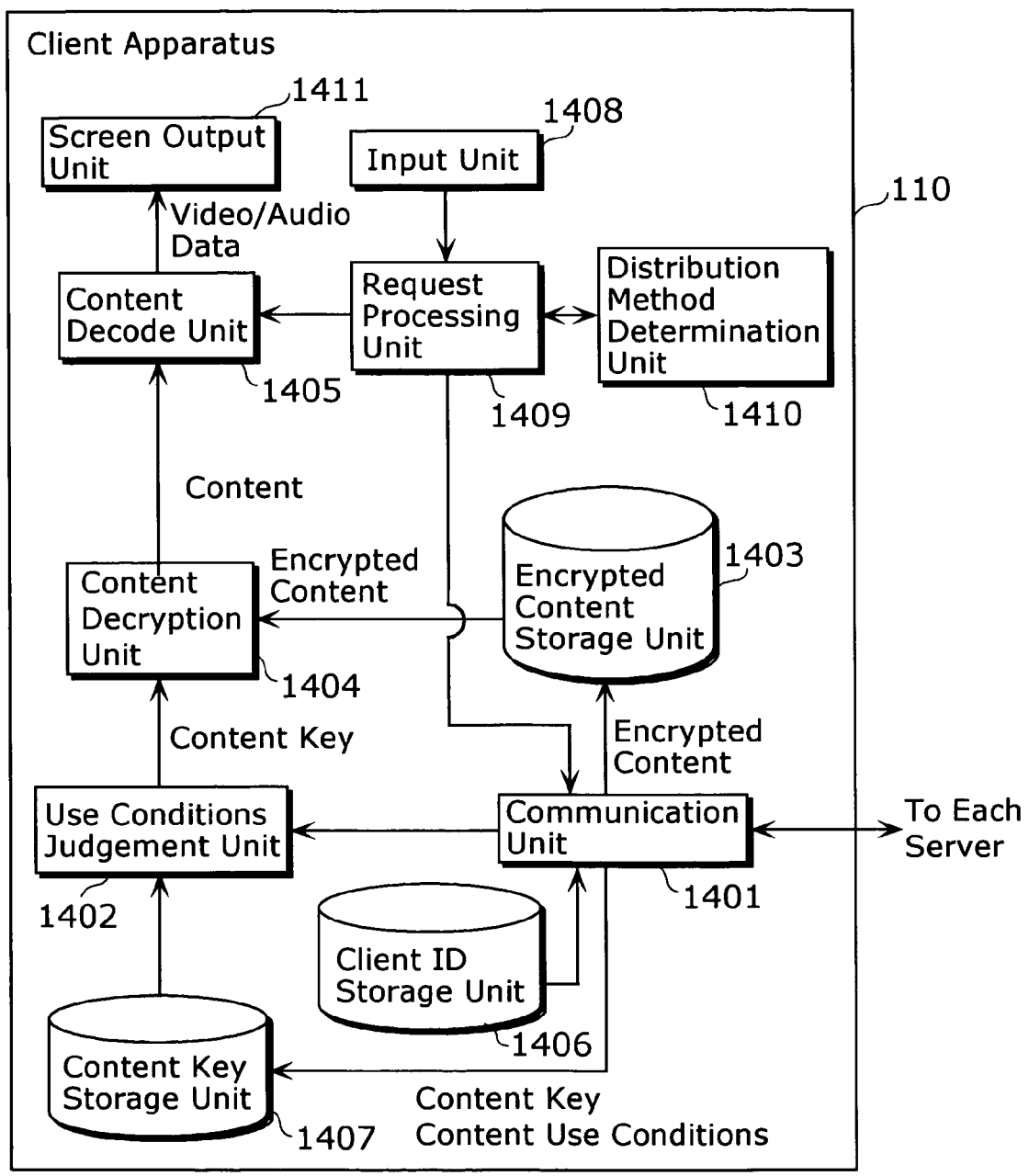
FIG. 15 is a functional block diagram showing a configuration of a client apparatus.
Figure 16:
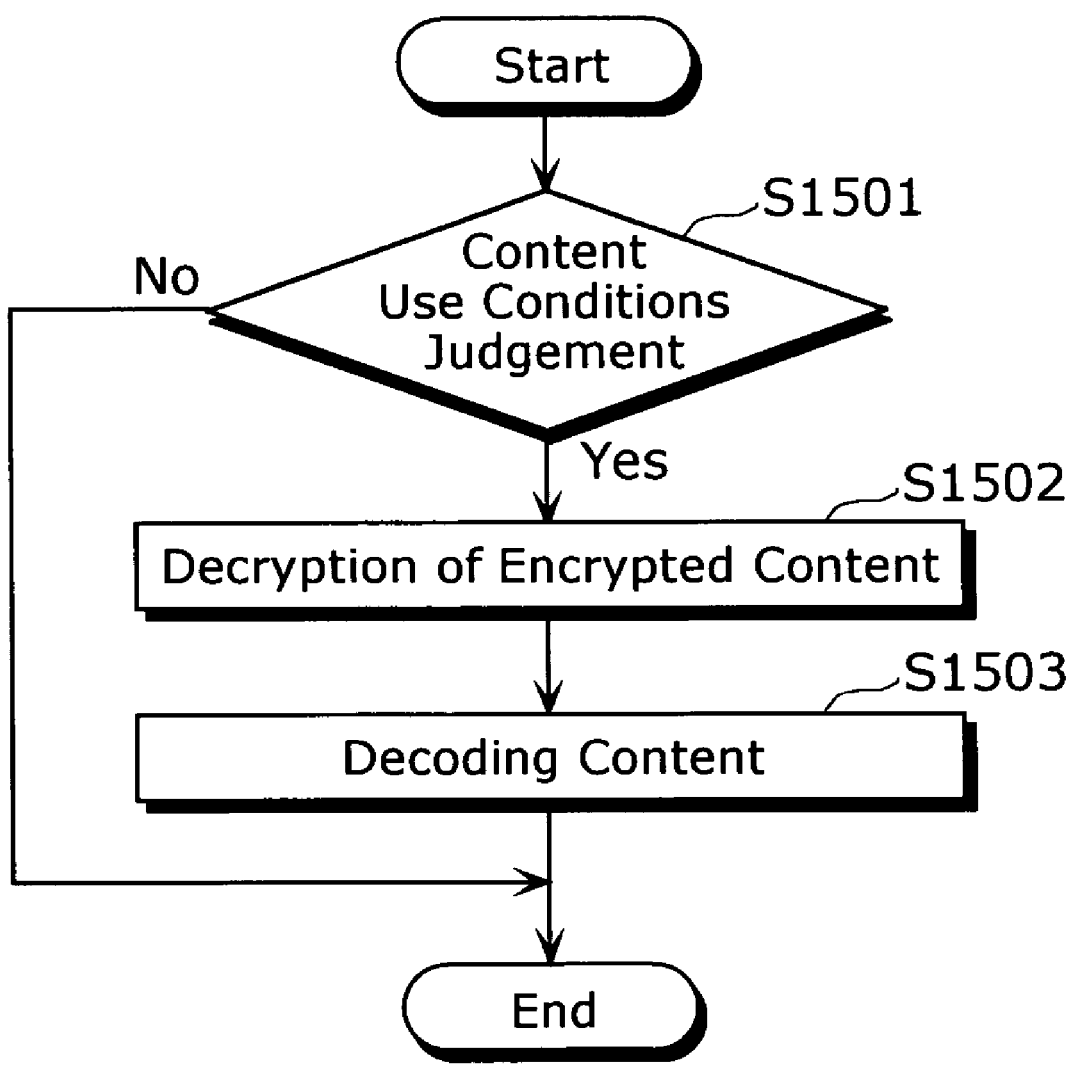
FIG. 16 is a flowchart showing a reproduction process in the client apparatus.

Referring next to FIG. 15 and FIG. 16, the detail about the reproduction process inside the client apparatus 110 at the step S1311 in FIG. 14 is explained. FIG. 15 is a functional block diagram showing a configuration of the client apparatus 110. FIG. 16 is a flowchart showing the operation of the content reproduction process inside the client apparatus 110 at the step S1311 in FIG. 14.

The client apparatus 110 has a communication unit 1401, a use conditions judgement unit 1402, an encrypted content storage unit 1403, a content decryption unit 1404, a content decode unit 1405, a client ID storage unit 1406, a content key storage unit 1407, an input unit 1408, a request processing unit 1409, a distribution method determination unit 1410, and a screen output unit 1411.

The communication unit 1401 is a function processing unit to communicate with all kinds of servers. The use conditions assessment unit 1402 is a function processing unit to judge whether new use of a content meets the content use conditions. The encrypted content storage unit 1403 is a memory unit and a function processing unit which stores the encrypted content. The encrypted content obtained at the step S1305 and the step S1308 in FIG. 14 is stored in the encrypted content storage unit 1403. The content decryption unit 1404 is a function processing unit which decrypts the encrypted content using a content key.

The content decode unit 1405 is a function processing unit which decodes a content according to a content compression format and outputs video and audio data. The client ID storage unit 1406 is a memory unit and function processing unit which stores a client ID, and the communication unit 1401 obtains the client ID from here when a distribution of a client ID is needed in the communication with a server. The content key storage unit 1407 is a memory unit and function processing unit which stores a content key and content use conditions. The content key and content use conditions obtained at the step S1308 in FIG. 14 are stored in the content key storage unit 1407. The input unit 1408 is a function processing unit which inputs a request from the user. The request processing unit 1409 is a function processing unit which performs a process according to a request inputted by the input unit 1408. The distribution method determination unit 1410 determines whether the content key of the content selected by the user is distributed by the multicast distribution or by the unicast distribution. The screen output unit 1411 is a function processing unit which renders video to be reproduced and information from a server and presents them to the user.

The client apparatus 110 after obtaining a content key and content use conditions stored in the content key storage unit 1407 confirms at the use conditions judgement unit 1402 whether the new use of a content at the present time meets the conditions described in obtained content use conditions (S1501). For example, there are confirmations such as whether the number of reproduction times is not zero and whether the present time is within the available reproduction date and time. When the content use conditions are satisfied, the use conditions processing unit 1402 sends the content key stored in the content key storage unit 1407 (S1501). The content decryption key unit 1404 obtains the encrypted content from the encrypted content storage unit 1403 and decrypts it by the content key obtained from the use conditions judgement unit 1402 (S1502). The decrypted data is then sent to the content decode unit 1405. The content decode unit 1405 decodes the content according to its compression format, outputs the video and audio data (S1503) and terminates the process.

As mentioned above, according to the content distribution system 200 in the present embodiment, the distributors of content and a content key can distribute them by switching between the two distribution methods of a content key and content use conditions according to the attribute of each content. Accordingly, for example, when it is expected that there is a deluge of requests for distributing a content key and content use conditions of the same content, its content key and content use conditions are distributed by the multicast so that the processing load on the servers within the content distribution system 200 may be reduced. Further, when the copyright protection of content is prioritized to the processing load on the servers in the content distribution system 200, the content key and content use conditions are distributed by the unicast so that a security of the copyright is enhanced. Furthermore, the client apparatus 110, since its internal distribution method determination unit 1410 is capable of determining the distribution method of a content key and content use conditions, it is possible for the client apparatus 110 to freely obtain a content key and content use conditions which are distributed by a different distribution method for each content. Therefore, it becomes possible to use a desired content without any problems.

In addition, the content distribution management server 121, the multicast distribution server 122, the unicast distribution server 123, the encrypted content distribution server 124, and the user management server 120 may not be independent servers, and thus one server may serve for a function of the other servers.

Also, the distributions by the multicast do not have to be carried out every day.

The parameter which determines a distribution method of a content key may be the average rate of CBR and VBR, a content holder ID, content use conditions, and the like in addition to a compression format of a content.

Furthermore, as a method of choosing a parameter to determine a distribution method of a content key, the content holder may indicate a parameter to the content distribution management server 121 when registering the content or a parameter may be determined dynamically by the content distribution management server 121 depending on the processing loads on each server in the content distribution system 200.

As a method of obtaining an encrypted content, the distributions such as a distribution by media, and a distribution by broadcasting may be used.

Figure 17:
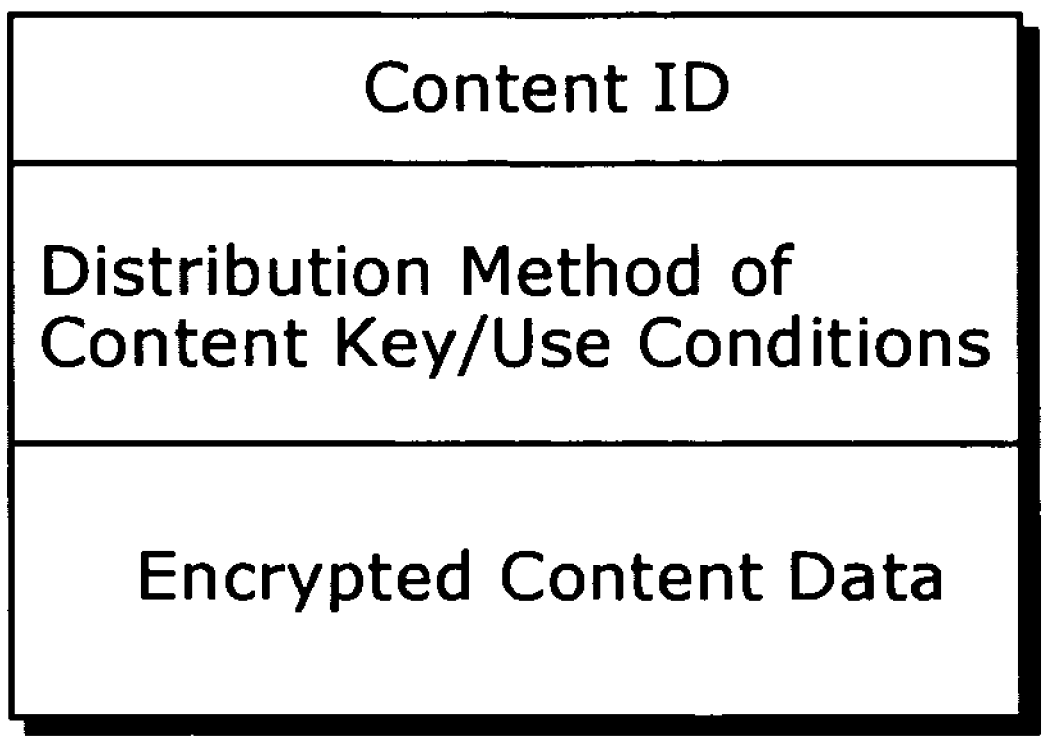
FIG. 17 is a diagram showing an example of a data structure of content on which information indicating the distribution method of the content key and the content use conditions is superimposed.

In the above-mentioned present embodiment, the client apparatus 110 judges a distribution method of a content key by requesting a distribution of a desired content to the encrypted content distribution server 124. More specifically, while the content key and content use conditions distributed by the multicast are superimposed on the content distributed only by the multicast distribution server 122, the present invention is not limited to this. For example, the client apparatus 110 may determine the distribution method of a content key by reading information superimposed on the content. In other words, information indicating the distribution method of a content key and content use conditions may be superimposed on the content, instead of the content key and content use conditions themselves. FIG. 17 is a diagram showing an example of a data structure of the content on which information indicating the distribution method of the content key and content use conditions is superimposed. As shown in the diagram, information indicating the distribution method of a content ID, a content key, and content use conditions is superimposed on the encrypted content data.

Here, the content distribution management server 121, after determining a distribution method of a content key and content use conditions of each content, superimposes information indicating the determined distribution method on each content and registers at the encrypted content distribution server 124. Consequently, all contents are distributed from the encrypted content distribution server 124 regardless of their distribution methods of the content keys and content use conditions. Also, the content distribution server 121, after determining a distribution method of a content key and content use conditions, registers the content key and content use conditions at the unicast distribution server 123 and the multicast distribution server 122 according to the determined distribution method.

In response to this, the client apparatus 110 firstly obtains an encrypted content from the encrypted content distribution server 124 when its user tries to use the content. Then, the distribution method determination unit 1410 judges a distribution method of the content key and content use conditions by the information superimposed on the obtained encrypted content, and obtains the content key and content use conditions from the corresponding server according to the result of the judgement. That is, in the case of where the distribution method of a content key and content use conditions is determined as the multicast, the client apparatus 110 waits for the content key and content use conditions to be distributed from the multicast distribution server 122, and in the case where the distribution method of a content key and content use conditions is determined as the unicast, the client apparatus 110 requests a distribution of the content key and content use conditions to the unicast distribution server 123. The following reproduction process of a content of the client apparatus 110 is as explained already in FIG. 16.

Further, the client apparatus 110 may obtain information to identify the distribution method of a content key and content use conditions from a server. Specifically, the client apparatus 110, in the process at the step S1303 shown in FIG. 14, requests information relating to the content to the content distribution management server 121. The content distribution management server 121 responds to the request of the client apparatus 110, reads out the data (information relating to the content) shown in FIG. 4 from the content distribution method management DB 141, and sends it to the client apparatus 110. The client apparatus 110, referring to the information relating to the content obtained by the content distribution management server 121, judges the distribution method of the content key, and obtains the content key and content use conditions from the server which corresponding to the determined distribution method.

According to this method, the client apparatus 110 does not need to obtain a content before getting its content key and content use conditions; the client apparatus 110 can use the content freely even if it obtained the content after obtaining the content key and content use conditions.

Regardless of a distribution method of a content key, all encrypted contents having the data structure shown in FIG. 8A may be managed and distributed by the encrypted content distribution server 124. Of course, as same as the above-mentioned present embodiment, only content whose content key is distributed by the unicast may have the data structure shown in FIG. 8A and distributed by the encrypted content distribution server 124; and content whose content key is distributed by the multicast may have the data structure shown in FIG. 8B and may be distributed by the multicast distribution server 122. Moreover, although the processing load on the unicast distribution server 123 becomes bigger, by eliminating the encrypted content distribution server 124, the unicast distribution server 123 and the multicast distribution server 122 may distribute content with the data structure shown in FIG. 8B instead.

In addition, the content distribution management server 121 does not need to send the listed information relating to the content as shown in FIG. 4 as it is at a request by the client apparatus 110. For example, the client apparatus 110 may inquire about a distribution of a content key and content use conditions for every content to use. In response to this, the content distribution management server 121 may sends a reply about the distribution method of the content key and content use conditions of only content about which an inquiry was made. Consequently, while the processing load on the content distribution management server increases, the processing load on the client apparatus 110 when judging the distribution method is reduced.

Further, instead of the content distribution management server 121 sending information relating to the content responding to a request by the client apparatus 110, the information relating to the content may be distributed to the client apparatus 110 in advance by broadcasting, the multicast or the like.

The client apparatus of the present invention is useful as a content reproduction apparatus with a communication function, a personal computer, a PDA (Personal Digital Assistant), a cellular phone, an STB (Set Top Box), and the like.

What is claimed is:

1. A content usage management system comprising:
a client apparatus that reproduces distributed content;
at least one distribution server; and
a database configured to store content to be distributed, the database storing the content on a non-transitory computer-readable recording medium, wherein
said client apparatus includes a usage control data receiving unit operable to receive usage control data including a key used for reproduction of the distributed content from said at least one distribution server, and a reproduction unit operable to reproduce the distributed content using the usage control data, and
said at least one distribution server includes a confirmation unit operable to confirm whether or not the content distributed to said client apparatus is content having a limited number of authorized reproduction times indicated by the usage control data, and a usage control data distribution unit operable to:
(a) distribute the usage control data by a unicast distribution method where the usage control data is distributed in response to a request from said client apparatus, when the number of authorized reproduction times of the content is limited, and
(b) distribute the usage control data to a plurality of client apparatuses including said client apparatus by a multicast distribution method where the usage control data is distributed to said plurality of client apparatuses simultaneously at a predetermined distribution time, when the number of authorized reproduction times of the content is not limited.

2. The content usage management system according to claim 1, wherein said at least one distribution server further includes:
a distribution method determination rule holding unit operable to hold a distribution method determination rule, the distribution method determination rule indicating a rule to determine whether the usage control data of the content is distributed by the multicast distribution method or the unicast distribution method according to whether or not the number of authorized reproduction times of the content is limited; and
a distribution method determination unit operable to determine the distribution method with reference to the distribution method determination rule corresponding to an attribute of the content,
wherein said usage control data distribution unit distributes the usage control data according to the distribution method determined by said distribution method determination unit.

3. The content usage management system according to claim 2, further comprising a content server for distributing content to said client apparatus, wherein said at least one distribution management server further includes:

a method information generation unit operable to generate information indicating the determined distribution method; and a method information sending unit operable to send the generated information indicating the distribution method to said content server by associating the generated information with the content to be distributed, wherein said content server distributes the content including the information indicating the distribution method.

4. The content usage management system according to claim 3, wherein said client apparatus includes:

a content obtainment unit operable to obtain a content from said content server;

a distribution method identification unit operable to extract the information indicating the distribution method from the obtained content and identify the distribution method for the usage control data corresponding to the content based on the extracted information; and a usage control data obtainment unit operable to obtain the usage control data from said distribution server according to the identified distribution method.

5. The content usage management system according to claim 4, wherein said usage control data obtainment unit (1) requests said usage control data distribution unit to distribute the usage control data corresponding to the obtained content when the identified distribution method is the unicast distribution method, and (2) waits until a predetermined distribution time at which the usage control data corresponding to the content is distributed when the identified distribution method is the multicast distribution method.

6. The content usage management system according to claim 2, wherein said distribution management server further includes:

a method information generation unit operable to generate information indicating the determined distribution method; and a method information sending unit operable to send the generated information indicating the distribution method to said client apparatus, and said client apparatus includes:

a method information obtainment unit operable to obtain the information indicating the distribution method from said distribution management server;

a distribution method identification unit operable to identify the distribution method for the usage control data corresponding to the content based on the information indicating the distribution method; and a usage control data obtainment unit operable to obtain the usage control data from said distribution server according to the identified distribution method.

7. The content usage management system according to claim 6, wherein said usage control data obtainment unit (1) requests said usage control data distribution unit to distribute the usage control data corresponding to obtained content when the identified distribution method is the unicast distribution method, and (2) waits until a predetermined distribution time at which the usage control data corresponding to the content distributed when the identified distribution method is the multicast distribution method.

8. The content usage management system according to claim 1, wherein said at least one distribution server including said usage control data distribution unit further includes an authentication unit to authenticate said client apparatus as an authorized user when said client apparatus is recognized as a previously registered client apparatus through communication with each client apparatus, and said usage control data distribution unit distributes the usage control data only to said client apparatus recognized as an authorized user.

9. The content usage management system according to claim 8, wherein said authentication unit authenticates said client apparatus by a PKI method.

10. The content usage management system according to claim 8, wherein said authentication unit authenticates said client apparatus by a common key system.

11. The content usage management system according to claim 1, further comprising a user management server that distributes a predetermined decryption key only to a previously registered user, wherein said at least one distribution server includes a control data encryption unit operable to encrypt the usage control data determined to be distributed by the multicast distribution method, using a key corresponding to the predetermined decryption key, and said usage control data distribution unit distributes the encrypted usage control data.

12. The content usage management system according to claim 1, further comprising a content server which distributes only content whose usage control data is determined to be distributed by the unicast distribution method, wherein said usage control data distribution unit distributes only the usage control data of the content to be distributed by said content server.

13. The content usage management system according to claim 1, wherein the usage control data further includes a use condition for using content, and said client apparatus further includes a reproduction control unit operable to extract the use condition from the obtained usage control data and control said reproduction unit to perform the reproduction within an extent to which the extracted use condition is satisfied.

14. A content usage management method comprising:

storing, in a database, content to be distributed, the database storing the content on a non-transitory computer-readable recording medium;

confirming, at an at least one distribution server, whether or not the content distributed to a client apparatus that reproduces distributed content, is content having a limited number of authorized reproduction times indicated by the usage control data;

distributing, from the at least one distribution server, usage control data including a key used for reproduction of distributed content, by a unicast distribution method where the usage control data is distributed in response to a request from the client apparatus, when the number of authorized reproduction times of the content is limited, and distributing, from the at least one distribution server, the usage control data to a plurality of client apparatuses including the client apparatus by a multicast distribution method where the usage control data is distributed to the plurality of client apparatuses simultaneously at a predetermined distribution time, when the number of authorized reproduction times of the content is not limited;

receiving, at the client apparatus, the usage control data from the at least one distribution server; and reproducing the content at the client apparatus using the usage control data.

15. A distribution server which distributes usage control data to a client apparatus, the distribution server comprising:
a database configured to store content to be distributed, the database storing the content on a non-transitory computer-readable recording medium;
a confirmation unit operable to confirm whether or not content distributed to said client apparatus is content having a limited number of authorized reproduction times indicated by the usage control data; and
a usage control data distribution unit operable to:
(a) distribute the usage control data by a unicast distribution method where the usage control data is distributed in response to a request from sai4the client apparatus, when the number of authorized reproduction times of the content is limited, and
(b) distribute the usage control data to a plurality of client apparatuses including the client apparatus by a multicast distribution method where the usage control data is distributed to the plurality of client apparatuses simultaneously at a predetermined distribution time, when the number of authorized reproduction times of the content is not limited, wherein the usage control data is data for controlling usage of content in the client apparatus.

16. The distribution server according to claim 15, further comprising a distribution method determination rule holding unit operable to hold a distribution method determination rule, the distribution method determination rule indicating a rule to determine whether the usage control data of the content is distributed by the multicast distribution method or the unicast distribution method according to whether or not the number of authorized reproduction times of the content is limited,
wherein a distribution method determination unit determines the distribution method with reference to the distribution method determination rule corresponding to an attribute of the content, and said usage control data distribution unit distributes the usage control data according to the distribution method determined by said distribution method determination unit.

17. A program recorded on a non-transitory computer-readable recording medium for causing a computer to function at least as:
a confirmation unit operable to confirm whether or not content distributed to a client apparatus is content having a limited number of authorized reproduction times indicated by usage control data; and
a usage control data distribution unit operable to:
(a) distribute usage control data by a unicast distribution method where the usage control data is distributed in response to a request from the client apparatus, when the number of authorized reproduction times of the content is limited, and
(b) distribute the usage control data to a plurality of client apparatuses including the client apparatus by a multicast distribution method where the usage control data is distributed to the plurality of client apparatuses simultaneously at a predetermined distribution time, when the number of authorized reproduction times of the content is not limited, wherein the usage control data is data for controlling usage of content in the client apparatus.

* * * * *